United States Patent [19]

Carey, Jr.

[11] 4,334,503

[45] Jun. 15, 1982

[54] ANIMAL CONTROL DEVICE

[76] Inventor: Sam H. Carey, Jr., P.O. Box 14031, Orlando, Fla. 32807

[21] Appl. No.: 151,146

[22] Filed: May 19, 1980

[51] Int. Cl.³ ............................................. A01K 3/00
[52] U.S. Cl. .................................................... 119/121
[58] Field of Search ............... 119/117, 118, 119, 120, 119/121, 122, 123; 248/156, 530

[56] References Cited

U.S. PATENT DOCUMENTS

| | | | |
|---|---|---|---|
| 802,411 | 10/1905 | Schaaff | 119/121 X |
| 942,859 | 12/1909 | Kersey | 119/121 X |
| 1,092,036 | 3/1914 | Fry | 119/117 |
| 2,502,807 | 4/1950 | Temmer | 119/121 |
| 3,100,476 | 8/1963 | Peak | 119/117 X |
| 3,189,004 | 6/1965 | Sinclair | 119/121 X |
| 3,921,589 | 11/1975 | McGahee | 119/121 |

*Primary Examiner*—Gene Mancene
*Assistant Examiner*—Robert P. Swiatek
*Attorney, Agent, or Firm*—Alfred E. Wilson

[57] ABSTRACT

An animal control device for a dog or other domestic animal comprising an upright member with a laterally enlarged lower end portion buried a substantial distance below ground level to stabilize the device, an aboveground portion with a steel O-ring loosely circumposed thereabout, an enlarged top end portion to prevent disengagement of the ring from the aboveground portion, an enlarged central portion having a bottom face in engagement with the surface of the ground, and a top portion to prevent contact of the ring with the ground when a line or leash is attached thereto with a dog attached to the opposite end thereof.

4 Claims, 3 Drawing Figures

ANIMAL CONTROL DEVICE

BACKGROUND OF THE PRESENT INVENTION

The purpose of the animal control device of the present invention is to provide an arrangement whereby a dog can be staked out in an open area under conditions whereby the lead or leash, which may be a rope or synthetic line of nylon, for example, cannot get tangled about the control device, and whereby the full length of the leash is always available to give the dog the advantage thereof.

The leash may be of such a length so as to permit the dog to be taken into the house at night, and the door closed without cutting the leash when the leash is formed of a suitable material such as nylon. The dog can then be merely released in the morning by opening the door to permit him to go out.

The need for this type of device is increasing as people more and more feel the need of dogs for protection, and laws regulating the care and control of dogs become more stringent.

Therefore, one of the principal objects of the present invention is to provide a dog control device which is designed to effectively control a dog within a predetermined circular area defined by the length of the leash connecting between the dog and the device without becoming tangled therewith.

A further object of the invention is to provide a dog control device which is easily installed in the ground and which effectively resists removal or loosening when subjected to generally laterally applied pull force such as those imparted thereto by a dog on a leash.

Yet another object of the present invention is to provide a dog control device which can be manufactured in a plurality of sizes, three for example, to control dogs from the smallest varieties up to the hundreds of pounds.

DETAILED DESCRIPTION OF THE DRAWINGS

Figure 1:
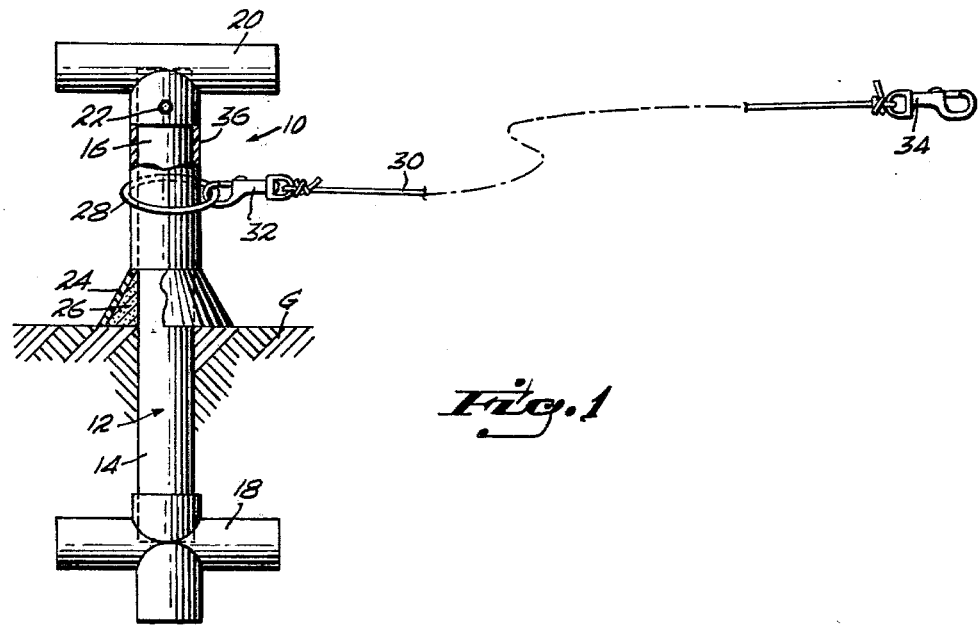
FIG. 1 is a side elevational view of the dog control device of the present invention with parts broken away to better illustrate the structural details thereof.

With reference to the drawings in which like reference characters designate like or corresponding parts throughout the several views, and with particular reference to FIG. 1, the dog control device is indicated generally at 10 and includes a generally vertically extending tubular post 12 having a lower portion 14 buried in the ground G and an above ground portion 16. Fixed to the lower end of portion 14 is a cross member 18 and an upright T-member 20 is removably attached to the upper end of portion 16 by attachment means such as a hex nut 22. Tubular post 12, cross member 18 and T-member 20 may be formed of any suitable material, a plastic such as P.V.C., aluminum or metal for example. A truncated cone 24 is fixed about the upper tubular post portion 16 at around level. Preferably, a cement material 26 fills the cone 24 between the post 12 and the inner surface thereof to cooperate with the bottom cross member 18 in stabilizing the device against laterally directed forces.

A steel o-ring 28 is disposed about the upper post portion 16 between the top T-member 20 and cone 24. O-ring 28 is enlarged relative to the diameter of post portion 16 for free confined movement between T-member 20 and cone 24. A leash 30 is attached to the o-ring by a snap catch 32 which is preferably of a conventional swivel type and a similar swivel snap catch 34 is fixed to the extended end of the leash for attachment to a dog's restraining device such as a collar or harness. In some instances, the snap catch 32 may be eliminated and the least 30 may be permanently attached to o-ring 28. The leash may be formed of any suitable material such as nylon, for example.

A sleeve 36 may be loosely disposed over the top tube portion 16 between the T-member 20 and cone 24 with the o-ring being loosely encircled about the sleeve 36 as illustrated in FIG. 1. It should be noted that the major portion of the cone 24 is substantially enlarged relative to o-ring 28 to prevent contact of the o-ring with the ground.

In installing the device 10, a hole is dug in the ground, the device 10 is inserted therein to the approximate depth illustrated in FIG. 1. The hole is then filled about the cross member 18 and lower portion 14, compacted to stabilize the posts and the cement material 26 is emplaced. With the top T-member 20 removed, the cone 24 is slid down over the cement 26. Sleeve 36 is then slid over top post portion 16 and the top T-member 20 is fixed in place by fastening means 22.

The modified form 10' of the invention disclosed in FIG. 2 employs a post 12' having below and above ground portions 14' and 16', a top loop member 20' which is welded closed, and with a cement filled cone 24' at ground level as well as an o-ring 28' and leash 30', all as in the form of FIG. 1. It will be understood that a loosely mounted sleeve, like the sleeve 36 of FIG. 1, may be rotatably mounted on the portion 16' between the top loop member 20' and the cone 24', and that the o-ring 28' may be loosely mounted thereon. The inverted bottom cross member 18 is replaced by an auger bit 40 which is formed from a flat metal disc which is radially cut and oppositely flared at 42, 44 to provide a screw type lead to turn it into the ground by rotational movement thereof.

The modified form 10" of the inventionn disclosed in FIG. 3 includes a tubular post 12" comprised of below and above ground portions 14" and 16" with a flat intermediate disc 50 fixed thereto to define the ground level position. The bottom end of portion 14" is beveled to define a sharp point 54 on one side thereof to permit the post 12" to be driven into the ground by hammering, for example. The top end of post 12" is provided with a reinforcing collar 56 and both the top edge of the post and collar 56 are notched as at 58 to receive and protect the leash 30" during the hammering operation.

As illustrated the leash 30" extends from a swivel snap catch 34", for attachment to the dog to the tubular post 12", downwardly through tubular post 12" to a point of central attachment 60 to a plate 62 which is companionately shaped on an enlarged scale relative to bevel 52, and is secured therealong as indicated by arrow 63 by means such as a suitable adhesive, welding, etc., depending upon the type of material utilized. In the drawing, for clarity, the plate 62 is illustrated in an exploded relationship to bevel 52.

A decorative flexible spring member 64 with a rubber cover 66 is secured to the top end of tube portion 16". Both the member 64 and cover have through openings 68 in axial alignment with the tubular post opening 70 for passage therethrough of the leash 30".

Figure 3:
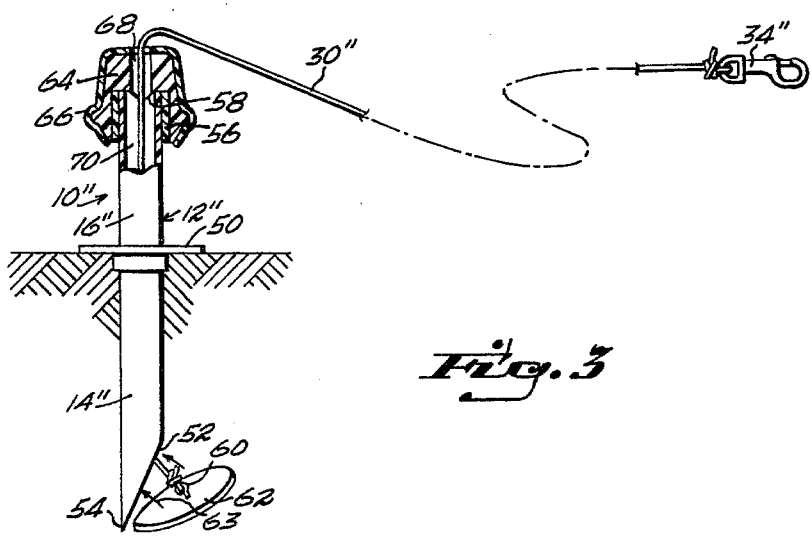
FIG. 3 is a side elevational view of a second modified form with parts broken away to illustrate the details thereof.

In installing the device of FIG. 3, the plate 62 is buried in a suitable location and the leash 30" is passed upwardly through the tubular post 12" disposed in the notch 58 and post 12" is hammered into the ground. Leash 30" is then passed through the member 64 and cover 66 openings 68 whereupon said member 64 is secured in place as in FIG. 3 by any suitable means such as a suitable adhesive material.

Figure 2:
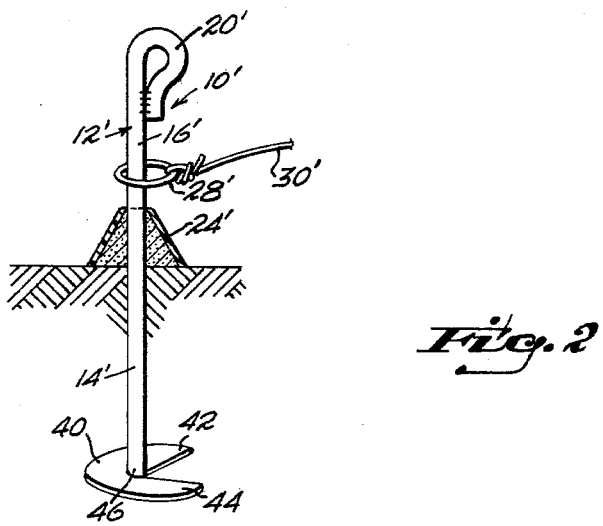
FIG. 2 is a side elevational view of a first modified form of the device.

The forms of the invention of FIGS. 1 and 2 may also be provided with decorative tops other than those previously illustrated and described. It is only essential that the top member be of a size so as to capture the steel o-ring 28 on the post top portion 16, 16'.

Particularly when a nylon leash is used, it has been found to be an effective deterrent from chewing of the leash if said leash is impregnated with cinnamon oil.

I claim:

1. An animal control device for staking out a dog comprising a main upright tubular post having a lower portion to be buried underground and an upper portion to extend a predetermined distance above ground level, flange means surrounding and extending outwardly from said post intermediate said lower and upper portions and including a lower face to engage the ground surface, an enlarged top end on said upper portion, said tubular upright post including a beveled lower end portion to define a pointed lower tip end, an enlarged member comprising a plate companionately shaped relative to a flat face defined by said bevel on an enlarged scale and being fixed thereto, a leash having a first end secured centrally to an inner face of said plate and extending upwardly through said tubular post and emerging from said top end of said upper portion and extending outwardly therefrom and having its opposite end adapted to engage a restraining device worn by a dog.

2. The dog control device as defined in claim 1 including a collar fixed about said upper portion and including a downwardly extending top end notch in said collar and upper portion.

3. The dog control device as defined in claim 2 wherein said enlarged top end comprises a flexible spring member provided with a socket engaged over and fixed to said upper portion and an axially aligned hole from said socket for through passage of said leash.

4. The dog control device as defined in claim 3 including a resilient cover disposed over said spring member and including a through hole through the cover in axial alignment with said socket and axially aligned hole for through passage of said leash.

* * * * *